March 8, 1938.  H. W. LEVERENZ  2,110,162
LUMINESCENT MATERIAL
Filed Jan. 31, 1935
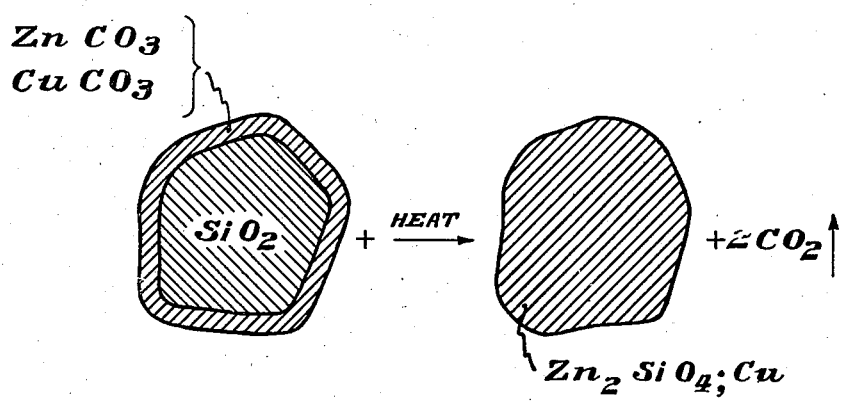
INVENTOR
*Humboldt W. Leverenz*
BY
ATTORNEY Patented Mar. 8, 1938

2,110,162

UNITED STATES PATENT OFFICE 2,110,162

LUMINESCENT MATERIAL

Humboldt W. Leverenz, Collingswood, N. J., assignor to Radio Corporation of America, a corporation of Delaware Application January 31, 1935, Serial No. 4,290

11 Claims. (Cl. 134—47)

My invention relates to improvements in luminescent materials.

One of the objects of my invention is to provide material adaptable particularly for the so-called luminescent screens for cathode ray tubes used in television receivers and on which an image of the transmitted object is reproduced, the material having advantages over those proposed heretofore in the way of increased intensity, efficiency, stability, and cathodoluminescence.

Other objects and advantages will hereinafter appear.

My improved material is an oxygen compound comprising a metal and an element of the fourth vertical column in the periodic system, and a metal of the sub-group of the first vertical column of the periodic system, such as copper or silver, as an activator to give to the compound the characteristics of becoming luminescent when exposed to radiant energy. By "radiant energy" I mean such radiation as electron bombardment, X-rays, alpha-particles, or actinic light or similar radiations.

By an activator, I mean the use of a relatively small amount of an element which is held in pseudo chemical bond and true physical bond. The small amount of the element which is added as an activator serves to increase the luminous efficiency of the luminescent material, while at the same time, it controls the spectral response in part of the luminescent material. The phenomenon is apparently one where the molecules of the activator element are held in the interstices of the crystalline faces of the luminescent material. My invention resides in the improved luminescent material of the character hereinafter described and claimed.

The figure of drawing is a pictorial illustration of the action which it is believed takes place in the course of making my improved luminescent material.

In carrying out my invention, the ingredients used are as pure as it is possible to obtain, the steps being as follows:

*First step.*—Solutions of zinc nitrate, $Zn(NO_3)_2$, and copper nitrate, $Cu(NO_3)_2$, are warmed together and stirred to thoroughly mix the two. Instead of copper nitrate, it is proposed to use silver nitrate, $Ag(NO_3)_2$. Considering a specific case, 1.0 mole of $Zn(NO_3)_2$ solution and approximately .0001 mole of $Cu(NO_3)_2$ solution were mixed together.

As alternatives in this step, it is proposed to use, instead of the zinc, any other metals such as magnesium, calcium, beryllium, strontium, or any other suitable metal in the first three groups of the periodic system and to use, especially, the alkaline earth metals in group II of this system.

*Second step.*—Finely divided, purified silicon dioxide (silica) is added. The particles of silicon dioxide are very small, preferably less than 100 microns in diameter. These particles may be obtained, for example, by grinding in a ball mill or the like, and then passing the material through a 400 mesh screen. In making the material known as zinc orthosilicate, as hereinafter explained, it is proposed to use the silicon dioxide in about 0.5 to 0.6 gram-molecular ratio to the zinc. Likewise, in making compounds known as the metasilicates, as hereinafter explained, it is proposed to use the silicon dioxide in about 1.0 to 1.2 gram-molecular ratio to the metal. In the specific case referred to, 0.5 mole of finely divided silicon dioxide ($SiO_2$) were added to the mixed solutions of zinc nitrate and copper nitrate. The combination was mixed well.

As an alternative in this step, it is proposed to add the silicon dioxide in the form of colloidal silicon dioxide.

As a further alternative, it is proposed to use germanium dioxide instead of silicon dioxide.

*Third step.*—The zinc and copper are precipitated as carbonates, oxalates, sulphides, hydroxides or phosphates. When the metals are precipitated as carbonates, this is done by adding sufficient ammonium carbonate or ammonium carbamate ($NH_4HCO_3NH_4NH_2CO_2$) for this purpose, or by making the solution slightly alkaline with ammonium hydroxide and then saturating the same with carbon dioxide. In the specific case referred to, ammonium carbamate was used in this step, 500 cc. of approximately 4.7 normal ammonium carbamate being added to the solution of the nitrates of zinc and copper, with the silicon dioxide, as explained. The mixture was then boiled and stirred, decanted while hot, and then evaporated to dryness while stirring. In this step, the zinc and copper are precipitated out of solution as insoluble carbonates, the remaining liquid containing only ammonium nitrate.

In the precipitating action, it is understood that the minute silicon dioxide particles serve as nuclei about which the zinc and copper carbonates agglomerate. That is, it is understood that each silicon dioxide particle serves as a core to which there adheres one layer or coating of precipitated carbonates of zinc and copper. This is represented at the left in the figure of drawing. The result is that, within the limitation of the previous sub-division of the silicon dioxide to practically molecular dimensions, a homogeneous mixture of silicon dioxide and the carbonates of zinc and copper is obtained.

*Fourth step.*—The resulting material is elutriated or washed with distilled water to remove practically all the ammonium nitrate. The last washing liquor is decanted, and the remaining mass is dried.

*Fifth step.*—The dried material is then heated in a platinum or other suitable crucible at a temperature from 900° to 2800° centigrade and for a period from 5 to 150 minutes, depending upon the amount of the material and the characteristics of the heating furnace, as will be well understood. In the specific case referred to, the material was heated at about 1200° C. for two hours, and then removed from the furnace and allowed to cool in the air. The resulting material gave a violet-blue color of luminescence under bombardment by the electrons of a cathode ray beam.

In view of the fact that $CO_2$ is driven off during this final heating step, it might very naturally be inferred that the resulting compound would be a mixture of zinc and copper silicates. Such is apparently not the case, since the final material seems to be a zinc orthosilicate wherein copper is entrained as an activator. The formula, $Zn_2SiO_4;Cu$, therefore, has been assigned to my improved synthetic willemite, but it is to be definitely understood that I am not to be bound by any particular theory of formation thereof. I have used a semi-colon in the formula to indicate that the presence of the thus conjoined metal is that of an activator.

In cases where the zinc and copper are precipitated as sulphides, it is proposed, in this step, to heat the material in an atmosphere containing oxygen. This decomposes the sulphides and removes the sulphur and sulphur dioxide.

As an alternative in this step, and in the specific case referred to, it is proposed to melt a small quantity of the material, such as 0.1 to 5.0 grams, at about 1550° C. for about one hour, and then to remove the material from the furnace and cool it rapidly by quenching, such as by plunging the material immediately into water at about 4° C. The resulting material is characterized by the fact that it has an almost white cathodoluminescence, with a bluish tinge.

Where germanium dioxide is used instead of silicon dioxide, the final result is to obtain a luminescent material known as a zinc orthogermanate, wherein copper is entrained as an activator. The formula of this material may be expressed as $Zn_2GeO_4;Cu$. As an alternative, where zinc is used it is proposed to replace the same by cadmium up to the extent of about 30%. Also, in the first step, the efficiency of secondary emission may be increased by adding a small amount of a suitable substance such as barium, strontium, caesium, cerium, thorium, rubidium, etc. Such a substance can also be added after the carbonates have been formed, such as after the decantation of the last washing water in the fourth step.

Where strontium is used instead of zinc, the resulting material is known as strontium metasilicate, $SrSiO_3;Cu$.

Where magnesium is used instead of zinc, the resulting material is known as magnesium orthosilicate, $Mg_2SiO_4;Cu$.

The formation of the material known as zinc orthosilicate, with copper as the activator, may be expressed as follows:

$$2ZnCO_3 + SiO_2 + Cu \rightarrow Zn_2SiO_4;Cu + 2CO_2 \uparrow$$

The formation of the material known as zinc orthogermanate, with copper as the activator, may be expressed as follows:

$$2ZnCO_3 + GeO_2 + Cu \rightarrow Zn_2GeO_4;Cu + 2CO_2 \uparrow$$

For the purpose of obtaining greater brilliancy as the screen, made of my improved material, is scanned by a cathode ray, it is proposed, in the making of the screen, to mix in with the various ingredients from one percent to ten percent of an element or elements which yield X-rays under cathode ray bombardment. Elements for this purpose may be molybdenum, tungsten, thallium, tin, platinum, etc., or compounds of these elements. The X-rays, having greater penetrating power than the cathode rays, are effective to excite the particles below the surface of the screen, and, also, penetrate further into the individual particles or crystals than the cathode rays. With the addition of an element of the character referred to, therefore, the screen may have greater brilliancy than would otherwise be the case, under the same operating conditions.

For the purpose of obtaining a greater degree of secondary emission, it is also proposed to add to the ingredients, in making my improved material for the screen of a cathode ray tube, a radio-active material such as radium, mesothorium, actinium, or their compounds. The amount of this material added may be from one ten-thousandth of one percent to one percent, as might be required.

The various weights and temperatures given above are not critical in any strict sense of the word, and may be varied over a wide range.

From the foregoing it will be seen that I have provided an improved luminescent material which is an oxygen compound, and which comprises a metal and an element of the fourth vertical column in the periodic system, and a metal of the sub-group of the first vertical column of the periodic system, such as copper or silver, as an activator to give to the compound the characteristic of becoming luminescent upon being excited. The light emitted from my improved luminescent material, when excited, is very rich in those frequencies that are photo-actinic. For this reason it is particularly desirable for use in the event that photographs are to be taken of a screen, either during X-ray examinations or during the reception of television programs and the like. The term "excited" as used alone hereinbefore and in the claims, is to be construed as meaning the condition assumed by the material when exposed to electron bombardment, X-rays, alpha-particles, or actinic light.

In making my improved material as explained, a good luminescent willemite is obtained in which there is as homogeneous a mix of all the constituents as the division of the silicon dioxide or the germanium dioxide will afford. This division can be made so small that the dioxide particles can be sub-divided to practically molecular dimension.

It will be understood that modifications, within the conception of those skilled in the art, are possible without departing from the spirit of my invention or the scope of the claims.

I claim as my invention:

1. A metallic ortho-germanate activated by a metal of the second sub-group of the first vertical column of the periodic system which gives to the combination the characteristic of becoming luminescent upon being excited by irradiations of "radiant energy."

2. A metallic ortho-silicate activated by a metal of the second sub-group of the first vertical column of the periodic system which gives to the combination the characteristic of becoming luminescent upon being excited by irradiations of "radiant energy."

3. A luminescent compound comprising a metal selected from those included in Group II of the periodic series of the elements combined with an oxygen containing acid of one of the metals included in Group IV of the periodic series of the elements, and an activator chosen from one of the metals in the second sub-group of Group I of the periodic series of the elements.

4. A luminescent compound comprising a metal selected from Group II of the periodic series of the elements combined with an oxygen containing acid of silicon, and copper as an activator.

5. A luminescent compound comprising a metal selected from Group II of the periodic series of the elements combined with an oxygen containing acid of germanium, and copper as an activator.

6. A luminescent material consisting of copper activated zinc ortho-silicate.

7. A luminescent material consisting of copper activated zinc ortho-germanate.

8. A luminescent compound comprising a metallic ortho-silicate and a silver activator.

9. A luminescent compound formed from chemical action between a zinc salt and silicon dioxide and copper as an activator.

10. A luminescent compound formed from chemical action between a zinc salt and silicon dioxide and silver as an activator.

11. A luminescent compound formed from chemical action between a zinc salt and germanium dioxide and copper as an activator.

HUMBOLDT W. LEVERENZ.